United States Patent [19]

Stapleton et al.

[11] 3,818,375

[45] June 18, 1974

[54] MULTISIDED ELECTRON BEAM EXCITED ELECTRICALLY PUMPED GAS LASER SYSTEMS

[75] Inventors: Robert E. Stapleton, Los Alamos, N. Mex.; Robert O. Hunter, Jr., Riverside, Calif.

[73] Assignee: The United States of America as represented by the United States Atomic Energy Commission, Washington, D.C.

[22] Filed: Mar. 27, 1973

[21] Appl. No.: 345,418

[52] U.S. Cl..................... 331/94.5, 330/4.3, 313/74
[51] Int. Cl.......................... H01s 3/02, H01s 3/22
[58] Field of Search........ 331/94.5; 330/4.3; 313/74

[56] References Cited
UNITED STATES PATENTS

| | | | |
|---|---|---|---|
| 3,451,010 | 6/1969 | Maiman | 331/94.5 |
| 3,641,454 | 2/1972 | Krawetz | 331/94.5 |
| 3,651,367 | 3/1972 | Yamamoto et al. | 331/94.5 |

OTHER PUBLICATIONS

Crocker et al., Electronics Letters, Vol. 5, No. 4, Feb. 20, 1969, pp. 63–64.

Primary Examiner—Ronald L. Wibert
Assistant Examiner—R. J. Webster
Attorney, Agent, or Firm—John A. Horan; Paul D. Gaetjens

[57] ABSTRACT

A gas laser amplifier system having a plurality of pumping chambers spaced around the circumference of a vacuum chamber which has disposed within it an electron gun system which produces a plurality of electron beams. The electron beams are sufficiently energetic and so directed that they produce substantial ionization through the entire volume of gaseous lasing medium that is to be electrically pumped in each pumping chamber. The system is adapted for use with lasing media at atmospheric pressure and above and is particularly useful with He—$N_2$—$CO_2$ gas mixtures.

8 Claims, 6 Drawing Figures

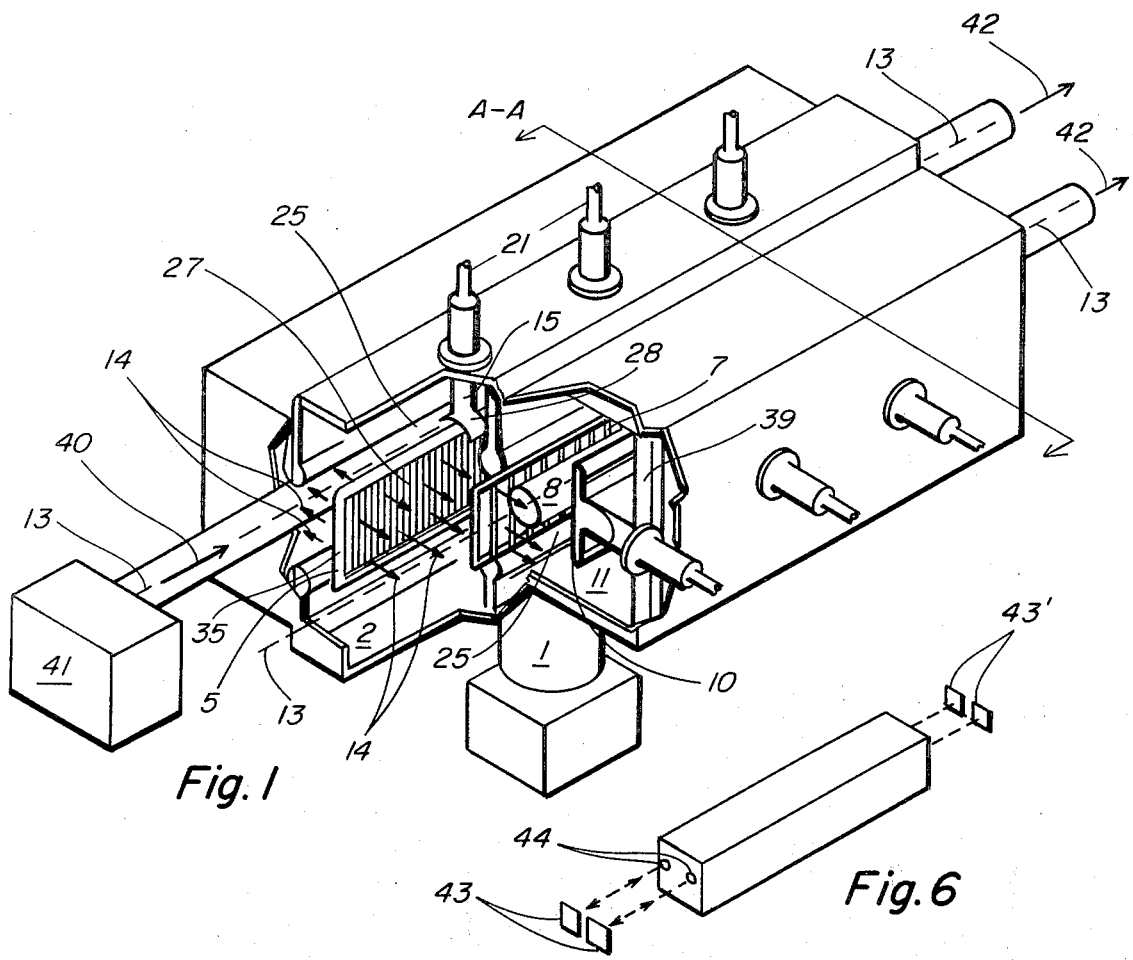
Fig. 1
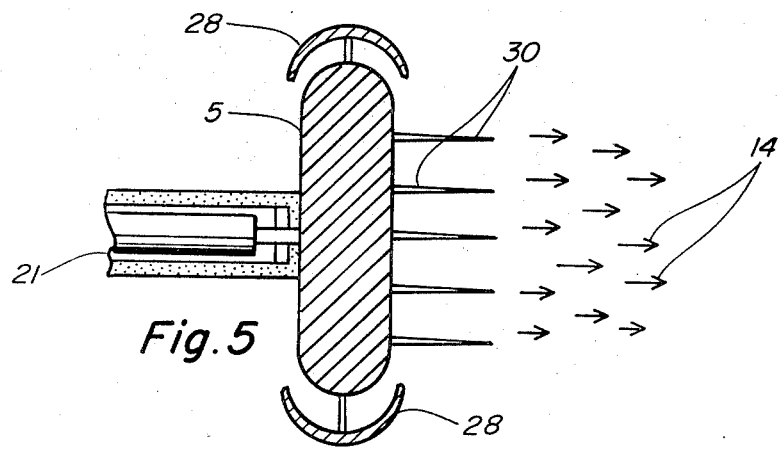
Fig. 5
Fig. 6

MULTISIDED ELECTRON BEAM EXCITED ELECTRICALLY PUMPED GAS LASER SYSTEMS

BACKGROUND OF THE INVENTION

The invention described herein was made in the course of, or under, a contract with the U.S. Atomic Energy Commission. It relates to gas laser systems, and more particularly to an electrically pumped gas laser system in which the ionization mechanism is separated from the sustainer electric field.

The power of electrically excited gas lasers, especially the $CO_2$ lasers, can be significantly improved if such lasers can be operated at atmospheric pressures and above. What is sought are means to provide more efficient excitation of the gas volume, i.e., more efficient and effective electrical pumping, greater energy density, uniform optical quality, and greater collisional line broadening. The problem is one of achieving uniform electrical discharges in the gas volume at high pressures, that is, atmospheric pressure and above. At these pressures, application of a sustainer electric field alone to produce a self-sustaining discharge in the gas quickly leads to formation of high-current constricted arcs. The instability mechanisms which result in arc formation in self-sustained discharges are not well understood, but have been attributed to cathode processes involving field emission, local heating, and other spark charge distribution of the cathode electric field. A discussion of this problem is given in U.S. Pat. No. 3,702,403, which issued Nov. 14, 1972.

It is known in the art, however, that a plasma can be stabilized through substantially the entire volume of highpressure laser gas if the electron-ion production mechanism in the plasma is made independent of the electromagnetic field through use of an external ionization source consisting of a high-energy electron beam. See, e.g., Fenstermacher et al., 20 Applied Physics Letter 56 (1972). In such an externally controlled plasma the applied (sustainer) electric field can be much lower than those required for self-sustaining discharges.

Plasma stabilization by this technique permits large volumes of laser gas to be electrically pumped to produce optimum population inversion. As a consequence, high-powered amplifiers may readily be constructed. Depending on the application, it is frequently desirable to use a number of such amplifiers either in series or in parallel. Thus, for example, in laser fusion work it is desired to irradiate a target simultaneously with multiple high-powered laser beams. This requires at least one amplifier for each beam since it is not possible to produce the requisite sufficiently short and sufficiently energetic pulses in an oscillator configuration.

SUMMARY OF THE INVENTION

We have found that by combining varying numbers of single amplifier units into one multisided unit producing multiple electron beams, the complexity of the resulting laser system is substantially reduced from the electrical and mechanical engineering standpoint in that simpler vacuum systems and lesser numbers of high voltage pulsers may normally be used. Multisided units are also much more compact than multiple individual amplifier units.

A multisided unit consists of a plurality of electrical pumping chambers spaced around the circumference of a vacuum chamber which has disposed within it an electron gun system which produces a plurality of electron beams. The electron beams are of sufficient power and so directed that a plasma is produced through substantially the entire volume of gaseous lasing medium that is to be electrically pumped in each pumping chamber. Each electrical pumping chamber is configured to act as an optical cavity. Multisided units are adapted for use with lasing media at atmospheric pressure and above and are particularly useful with $He-N_2-CO_2$ gas mixtures. They are in no way limited to such mixtures, however. The laser gas may be CO, HF, or any other gas or combination of gases which may be electrically pumped to produce a population inversion at high pressures. Although multisided units are particularly useful in amplifier configurations, they are not limited to amplifier uses and may readily be adapted to oscillator configurations as well.

BRIEF DESCRIPTION OF THE DRAWINGS

FIG. 1 is partially cut away perspective view of a two-sided amplifier unit in accordance with the invention.

FIG. 5 is a cross-sectional view of a cold cathode electron gun suitable for use with apparatus of the invention.

FIG. 6 is a schematic view of the apparatus of FIG. 1 in an oscillator configuration.

DEFINITIONS

Figure 2:
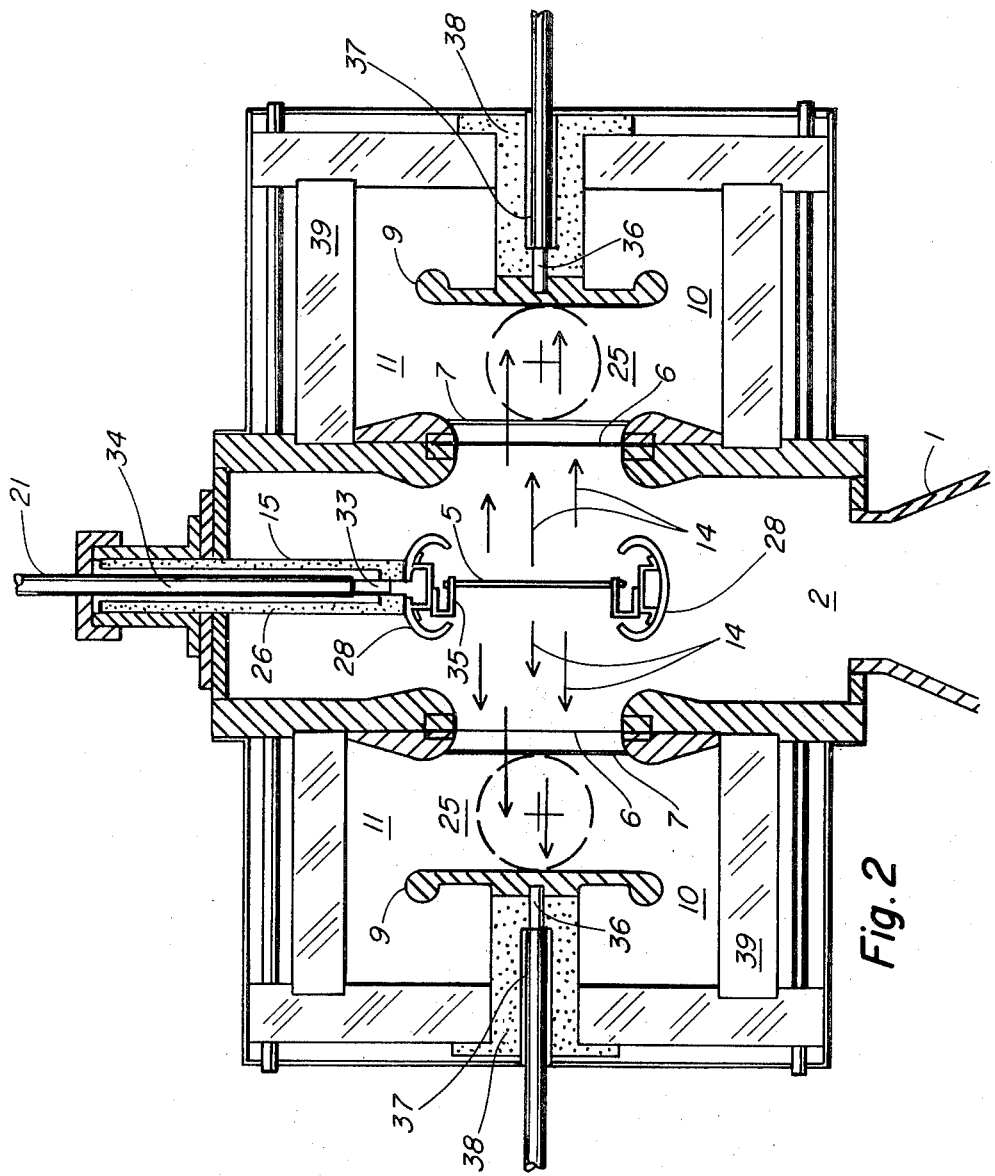
FIG. 2 is a cross sectional view of the unit of FIG. 1 along plane A—A.

As used within this application an optical cavity is a region wherein laser light is produced or amplified. It thus includes within its meaning the term "optical resonant cavity." Electrical pumping means the addition of electrical energy to a laser gas in a quantity and manner sufficient to produce a population inversion therein. Substantial ionization means that the number density of ion pairs produced in the lasing medium provides adequate conductivity to allow electrical energy to be deposited in the medium at a rate consistent with the relaxation rate of the population inversion of the medium. The term plasma implies substantial ionization as above defined.

DESCRIPTION OF THE PREFERRED EMBODIMENTS

In the laser amplifier units shown in FIGS. 1 through 4, a plurality of electrical pumping chambers 11 contain gaseous laser mediums 10 at high pressure, typically atmospheric pressure and above. Ionization of the gas in regions 25 between cathodes 7 and anodes 9 is initiated and maintained by high-energy electron beams 14 which penetrate through the laser gas volume. The gas in regions 25 is pumped by uniform electrical discharges established between cathodes 7 and anodes 9. Each discharge imparts an electric field to the laser gas in each region 25 which is optimum for excitation of the upper laser level in the gas, and whose current density, and hence rate of electrical energy deposition, is determined by the electron density established by the secondary ionization produced by electron beams 14. Each region 25 between anodes 9 and cathode 7 may therefore be considered as an optical cavity. Beams 14 are produced by means of electron guns 15 operating in vacuum chamber 2. A vacuum dependent on the type of electron guns 15 used is drawn in chamber 2 by means of vacuum manifold 1 (shown only in FIGS. 1 and 2). An appropriate voltage is applied to guns 15 for a time sufficient to accelerate electron beams 14 from cathodes 5 through vacuum windows 6 into regions 25 and substantially ionize the gas within these regions. An effective optical cross section 8 in each region 25 which may be considered the optical cavity in each pumping chamber 11 is swept by an oscillator or preamplified laser pulse 40 along optical axes 13 (shown only in FIG. 1) from oscillator or amplifier 41 to produce strongly amplified pulses 42 of laser light.

Various means may be used to produce electron beams 14. Thus, for example, electron guns 15 may be plasma guns or multipactoring guns or may utilize hot cathodes, cold cathodes, field emission cathodes, photoemission cathodes, etc. As shown in FIGS. 1 through 4, guns 15 are hot cathode guns. High voltage feeds 21 are introduced into vacuum chamber 2 and connected to hot cathodes 5. Feeds 21 are insulated from vacuum chamber 2 and connected to hot cathodes 5. Feeds 21 are insulated from vacuum chamber 2 by means of high voltage insulators 26. Hot cathodes 5 consist of a plurality of resistively heated metal filaments 27 (see FIG. 1). As used within this specification, filament means any elongated structure, such as a wire, rod or bar of a material which when heated to an appropriate temperature acts as a strong electron emitter. The term "filament" further encompasses woven or otherwise interconnected structures of an electron-emitter material having end portions periodically extending therefrom on opposing edges whereby said "filament" may be supported in a filament support structure. Rapid heating of filaments 27 by means of either alternating or direct current produces the requisite electron beams 14. Current for heating filaments 27 may be single or three phase. Field shaping electrodes 28 are located at either end of each hot cathode 5. Electrodes 28 serve to ensure that electron beams 14 pass through windows 6 and do not impinge on walls 29 of vacuum chamber 2.

Alternatively, guns 15 may be of the cold cathode variety as shown in FIG. 5. In FIG. 5, cathode 5 has embedded in it a plurality of substantially parallel knife-edged electrodes 30, which when subjected to a sufficiently high voltage from high voltage feed 21 emit the requisite high voltage beam 14. Cold cathode operation requires a substantially lower vacuum in chamber 2 than does use of hot cathode electron guns. Thus, for example, whereas hot cathodes require a vacuum of about $10^{-6}$ Torr, cold cathodes operate at a vacuum of only about $10^{-4}$ Torr. Hot cathodes are normally preferred, however, because they are not susceptible to impedance collapse and also are capable of producing longer pulses.

Characteristics and operating parameters of a preferred embodiment of the invention are best illustrated by reference to FIGS. 1 and 2. It will be understood that similar characteristics and operating parameters are readily applicable to the configurations shown in FIGS. 3 and 4. In FIG. 3, it will be apparent that although only one pumping chamber 11 is shown in cross sectional detail, three additional such chambers 11 are symmetrically spaced around the circumference of vacuum chamber 2. Likewise in FIG. 4, although only two pumping chambers 11 are shown, six more are symmetrically spaced around the circumference of vacuum chamber 2. High voltage feed 21 consists of a copper lead 33 with polyethylene shielding 34. High voltage insulation 26 is typically aluminum oxide. Filament support structures 35 and shaping electrodes 28 are composed of TZM, which is a standard alloy consisting of 0.5 wt % Ti, 0.1 wt % Zr, and > 99 wt % Mo. Molybdenum is preferred for use in support structures 35 because of its low thermal conductivity, high stability and strength at design temperature, i.e., 1,650°–1,700° C on filaments 27, and high work function. Hot cathode 5 consists of 270 filaments 27 of thoriated tungsten, each 30 cm in length and with a diameter of 28 mils. Filaments 27 are spaced 0.75 cm apart to produce a hot cathode 5 having a longitudinal dimension of 202 cm. Electron beams 14 pass through titanium windows 6 into pumping regions 25. The thickness of windows 6 depends on the pressure in pumping chambers 11 and whether a titanium alloy is used, but typically is in the range of 0.8 to 1.2 mils. Walls 29 of vacuum chamber 2 are typically made of stainless steel and so shaped in the vicinity of windows 6 that field shaping electrodes 28 effectively preclude electron beams 14 from impinging on them.

In pumping chambers 11, cathode structures 7 consist of a plurality of stainless steel rods 0.065 inch in diameter and spaced 0.70 cm apart. Cathode structures 7 have substantially the same longitudinal dimension as hot cathode 5. Spaced 28 cm from cathode structures 7 are stainless steel anodes 9 which have a Rogowski profile. Anodes 9 are connected to high voltage copper leads 36 having polyethylene shielding 37. Within pumping chambers 11, high voltages leads 36 are also surrounded by high voltage insulation 38 of aluminum oxide. Walls 39 of pumping chambers 11 may be of any nonconducting material of a strength sufficient to contain the laser gas at a desired pressure. Fiberglass or various plastics are quite suitable.

Figure 3:
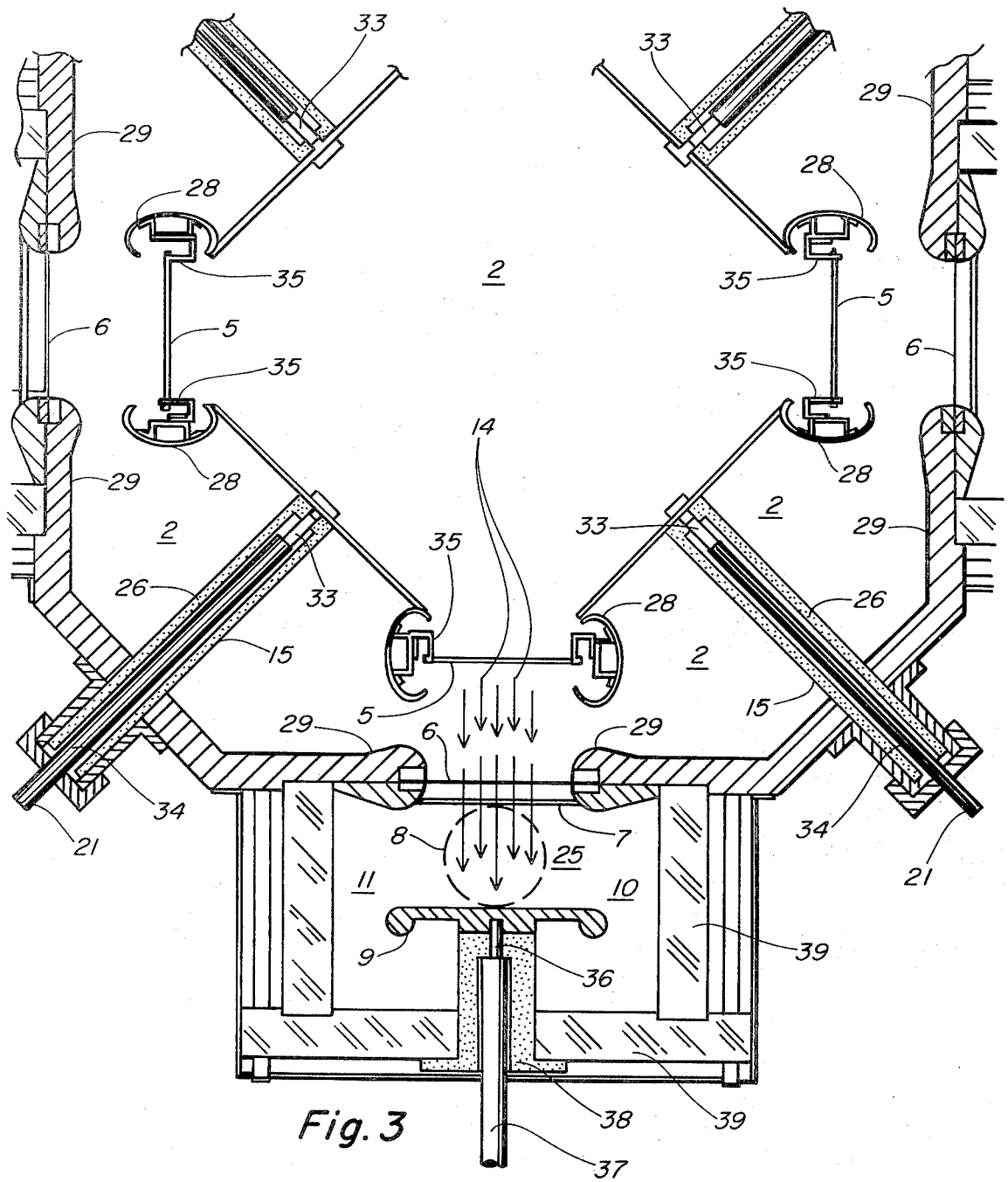
FIG. 3 is a partial cross-sectional view transverse to the optical axes of a four-sided amplifier unit in accordance with the invention.
Figure 4:
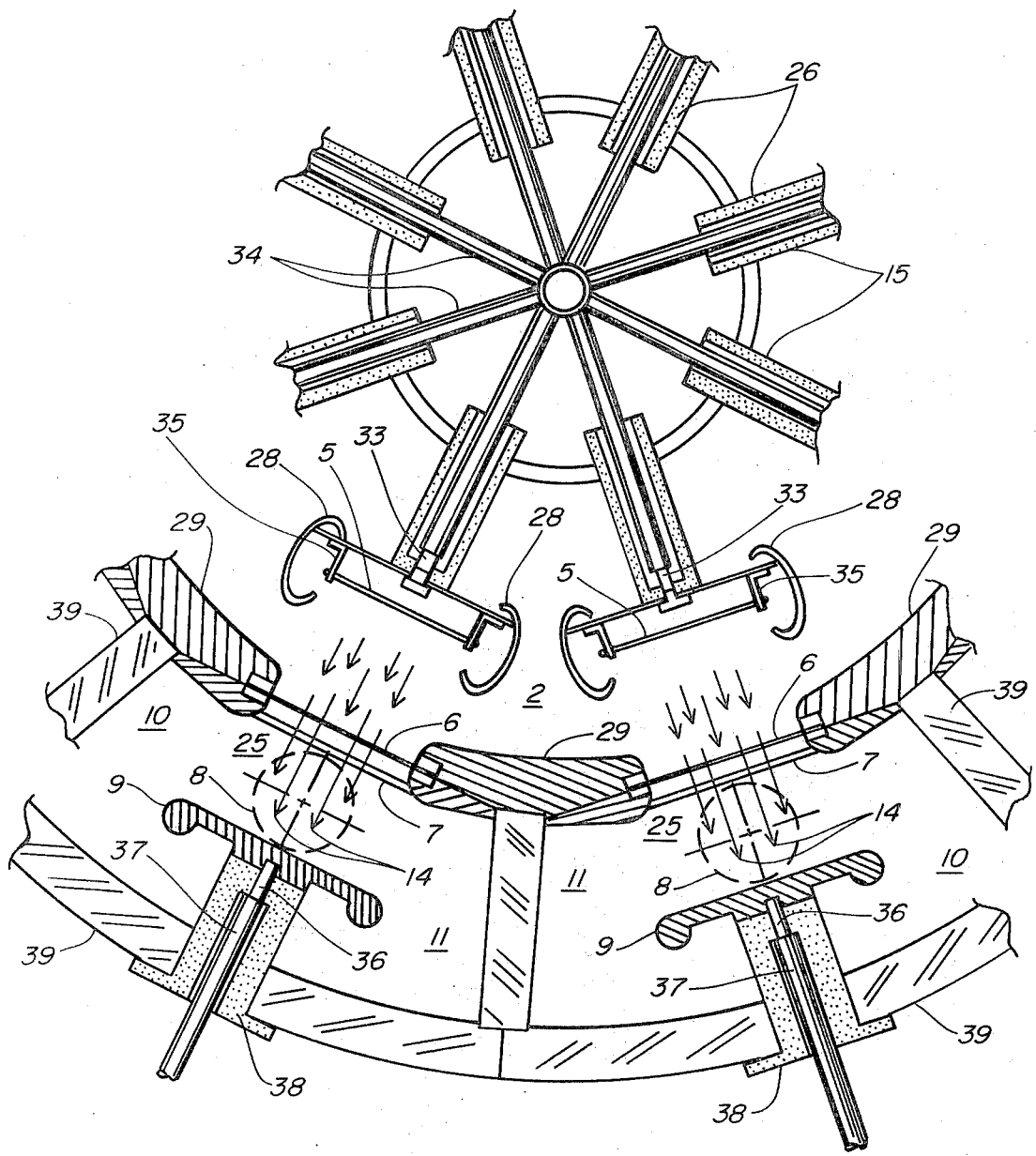
FIG. 4 is a partial cross-sectional view transverse to the optical axes of an eight-sided amplifier unit in accordance with the invention.

Typical operating parameters for the apparatus of FIGS. 1 and 2 are as follows: A voltage of 300 kV is applied to hot cathode 5 through high voltage feed 21 and at the same time filaments 27 are heated to 1,650°–1,700° C to produce a total electron beam current of 2,500 A (1,250 A in each 14) in 14)in a 6.0 $\mu$sec pulse. In each pumping chamber 11 a 300 kV field is applied between anodes 9 and cathodes 7. When this field is synchronized with the production of a plasma in regions 25 by beams 14, the net result is intended to be a 5.0 $\mu$sec, 50 kA current pulse in each region 25, with the pulse being uniform throughout the volumes between anode 9 and cathodes 7. A laser gas mixture consisting of the ratio by volume percent 3 He:0.25 $N_2$:1 $CO_2$ at a pressure of 2.4 atm (STP) is placed in each pumping chamber 11. The conditions are such that the gas in the volume between each anode 9 and each cathode 7 undergoes optimal electrical pumping. An effective optical cross section 8 having a diameter of 28 cm in each region 25 is swept by an oscillator or preamplified laser pulse along optical axes 13 to produce strongly amplified pulses of laser light of 1 nsec duration. The electrically pumped region 25 in each pumping chamber 11 is 200 cm long so that the total volume of gas in which the light is amplified is 3.14 ×

$(14 \text{ cm})^2 \times 200$ cm or about 123 liters in each pumping chamber 11. In a single pass configuration wherein the light to be amplified passes through each pumping chamber 11 only once, the system is designed to amplify an incoming 30-J pulse of light to 1,250J. In a triple pass configuration, wherein the incoming pulse of light passes through each pumping chamber 11 three times, an incoming pulse of less than 1 J energy is amplified to 1,250 J. Thus, under the operating conditions as herein outlined, two 1,250 J, 1 *nsec* pulses of 10.6 micron laser light may be achieved each time the system is pulsed.

The multisided electron beam controlled laser systems of this invention are not limited to amplifier configurations. For example, as shown schematically in FIG. 6, the amplifier unit of FIG. 1 is readily converted to an oscillator configuration by replacing oscillator or amplifier units 41 with mirrors 43, 43'. With adequately reflective mirrors 43, 43', the optical cavities of the unit of FIG. 1 become optical resonant cavities and the unit assumes an oscillator configuration. It will be apparent that mirrors 43, 43' may be spaced away from the pumping chambers or may actually take the place of windows 44. A pulse of laser light may be removed from the oscillator configuration of FIG. 6 by various means well known in the art.

What we claim is:

1. A gas laser system which comprises a plurality of electrical pumping chambers spaced around the circumference of a vacuum chamber, means disposed within said vacuum chamber for producing a plurality of electron beams, each of said beams being directed toward one of said pumping chambers, a plurality of window means in said vacuum chamber for passing said electron beams into said pumping chambers, a gaseous lasing medium contained in each of said pumping chambers, at least a pair of oppositely positioned electrodes within each of said pumping chambers, the volume between said electrodes forming an optical cavity, and means operatively connected to said electrodes for impressing across them a voltage less than the breakdown voltage of said lasing medium but sufficient to produce a high-energy, uniform discharge in said lasing medium when said medium is substantially ionized, each of said electron beams being of sufficient energy and cross section to produce a plasma through substantially the entire volume between said electrodes in said pumping chambers and said discharge being sufficient to produce a population inversion in said volume of said lasing medium.

2. The gas laser system of claim 1 wherein said optical cavity is an optical resonant cavity.

3. The gas laser system of claim 1 wherein said lasing medium is at atmospheric pressure and above.

4. The gas laser system of claim 1 wherein said lasing medium is a mixture of He, $N_2$, and $CO_2$.

5. The gas laser system of claim 1 wherein said means for producing a plurality of electron beams is a cold cathode assembly.

6. The gas laser system of claim 1 wherein said means for producing a plurality of electron beams is a hot cathode assembly.

7. The gas laser system of claim 7 wherein said hot cathode assembly comprises a plurality of hot cathodes, each of said hot cathodes being so positioned as to direct an electron beam into a pumping chamber.

8. The gas laser system of claim 1 wherein said oppositely positioned electrodes consist of a planar mode having a Rogowski profile and a cathode adjacent to said window means, said cathode consisting of substantially parallel rods adapted to allow passage of an electron beam entering through said window means into the volume between said cathode and said anode.

* * * * *